(12) United States Patent
Takeshita

(10) Patent No.: US 12,531,233 B2
(45) Date of Patent: Jan. 20, 2026

(54) NEGATIVE ELECTRODE FOR NONAQUEOUS ELECTROLYTE SECONDARY BATTERY AND NONAQUEOUS ELECTROLYTE SECONDARY BATTERY

(71) Applicant: PRIME PLANET ENERGY & SOLUTIONS, INC., Tokyo (JP)

(72) Inventor: Shuhei Takeshita, Nagakute (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 743 days.

(21) Appl. No.: 17/715,395

(22) Filed: Apr. 7, 2022

(65) Prior Publication Data

US 2022/0336792 A1  Oct. 20, 2022

(30) Foreign Application Priority Data

Apr. 15, 2021  (JP) ................. 2021-069049

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0404* (2013.01); *H01M 4/583* (2013.01);
(Continued)

(58) Field of Classification Search
CPC .... H01M 4/364; H01M 4/366; H01M 4/0404; H01M 4/583; H01M 10/056
See application file for complete search history.

(56) References Cited

U.S. PATENT DOCUMENTS 5,451,477 A     9/1995  Omaru et al.
6,803,150 B1 * 10/2004  Iriyama ............... H01M 4/1393
                                                            252/502
(Continued)

FOREIGN PATENT DOCUMENTS

CN      105765772 A      7/2016
EP      2 413 404 A1     2/2012
(Continued)

OTHER PUBLICATIONS

Toth, P., et al.; "Structure of Carbon Black Continuously Produced from Biomass Pyrolysis Oil", Green Chemistry, vol. 20, No. 17, pp. 3981-3992 (Jan. 1, 2018).

*Primary Examiner* — Jonathan G Jelsma
(74) *Attorney, Agent, or Firm* — Finnegan, Henderson, Farabow, Garrett and Dunner, LLP

(57) ABSTRACT

A negative electrode active substance layer of a negative electrode for nonaqueous electrolyte secondary battery herein disclosed includes at least a first negative electrode active substance and a second negative electrode active substance. The first negative electrode active substance is configured with an aggregated body of a scaly graphite whose surface of at least one part is covered with a low crystalline carbon. A graphite interlayer distance of the low crystalline carbon is equal to or more than 3.8 Å and not more than 5.0 Å. The second negative electrode active substance is a natural graphite or an artificial graphite whose graphite interlayer distance based on electron diffraction images by the transmission electron microscope is equal to or more than 3.35 Å and not more than 3.4 Å. Here, a mass ratio of the first negative electrode active substance and the second negative electrode active substance is 50:50 to 90:10.

4 Claims, 3 Drawing Sheets

(51) Int. Cl.
  *H01M 4/583* (2010.01)
  *H01M 10/056* (2010.01)
  *H01M 4/02* (2006.01)

(52) U.S. Cl.
  CPC .... *H01M 10/056* (2013.01); *H01M 2004/021* (2013.01); *H01M 2004/027* (2013.01); *H01M 2300/0094* (2013.01)

(56) References Cited

U.S. PATENT DOCUMENTS

| | | |
|---|---|---|
| 2004/0023115 A1 | 2/2004 | Kato et al. |
| 2007/0195488 A1 | 8/2007 | Kim et al. |
| 2012/0064403 A1 | 3/2012 | Kameda et al. |
| 2014/0134492 A1* | 5/2014 | Yamami ................ H01M 4/587 427/113 |
| 2015/0180019 A1* | 6/2015 | Lee ....................... H01M 4/134 264/105 |
| 2016/0276668 A1 | 9/2016 | Nagayama et al. |
| 2018/0248187 A1* | 8/2018 | Cheng .................. H01M 4/366 |
| 2021/0159489 A1 | 5/2021 | Sugaya et al. |

FOREIGN PATENT DOCUMENTS

| | | | |
|---|---|---|---|
| JP | 2002-175810 A | | 6/2002 |
| JP | 2002-255529 A | | 9/2002 |
| JP | 2004063321 A | * | 2/2004 |
| JP | 2004-127913 A | | 4/2004 |
| JP | 2013-118138 A | | 6/2013 |
| JP | 2014-067636 A | | 4/2014 |
| JP | 2017-054815 A | | 3/2017 |
| JP | 2017-142932 A | | 8/2017 |
| KR | 10-2007-0094721 A | | 9/2007 |
| KR | 10-2012-0003442 A | | 1/2012 |
| KR | 10-2012-0139631 A | | 12/2012 |
| WO | WO 2008/136561 A1 | | 11/2008 |
| WO | WO 2019/239652 A1 | | 12/2019 |

* cited by examiner

NEGATIVE ELECTRODE FOR NONAQUEOUS ELECTROLYTE SECONDARY BATTERY AND NONAQUEOUS ELECTROLYTE SECONDARY BATTERY

CROSS REFERENCE TO RELATED APPLICATIONS

The present application claims priority from Japanese Patent Application No. 2021-069049 filed on Apr. 15, 2021, which is incorporated by reference herein in its entirety.

BACKGROUND OF THE DISCLOSURE

1. Technical Field

The present disclosure relates to a negative electrode for nonaqueous electrolyte secondary battery and a nonaqueous electrolyte secondary battery.

2. Description of Background

A nonaqueous electrolyte secondary battery, such as a lithium ion secondary battery, is more lightweight and has a higher energy density than a previously existing battery, and thus it is preferably used as a vehicle-mounted high-output power supply, or as power supplies for personal computer and portable terminal.

A typical negative electrode for this kind of nonaqueous electrolyte secondary battery has a configuration in which a negative electrode active substance layer including a negative electrode active substance as a main component is formed on a sheet-shaped negative electrode collector. The negative electrode active substance included as the main component of the negative electrode active substance layer is a chemical compound that can reversibly store and discharge chemical species being electric charge carriers (e.g., lithium ion in the lithium ion secondary battery), and thus various carbon materials, for example, spherical graphite, are used. As for the spherical graphite described above, a material in which stress is applied to scaly graphites so as to form a spherically processed one is preferably used.

As for the technique related to the spherical graphite, for example, Japanese Patent Application Publication No. JP2014-67636 and Japanese Patent Application Publication No. JP2017-54815 can be obtained. Patent Document 1 discloses a composite carbon material in which a carbonaceous substance or a graphite substance is covered with a carbon material subjected to the pressure processing, in order to mitigate the particle expansion at the time of charging/discharging. Patent Document 2 discloses a manufacturing method of a lithium ion secondary battery negative electrode material for a purpose of improving the high rate property, in which a graphite granule having a void at the inside is soaked in a metal alkoxide solution to form a metal hydrate inside the graphite granule so as to cover the surface of the graphite granule with carbonaceous one.

SUMMARY

However, based on the result that the present inventor intensively studied, in the methods of Japanese Patent Application Publication No. JP2014-67636 and Japanese Patent Application Publication No. JP2017-54815, it was difficult to uniformly cover the inside of the spherical graphite (typically, each of the scaly graphites configuring the spherical graphite) and the expansion suppressing effect for the scaly graphite inside the graphite was insufficient. In addition, it was found that, since the edge surface of the scaly graphite was not effectively covered, the edge surface and the nonaqueous electrolyte reacted excessively so as to increase the resistance of the negative electrode. In addition to this, it was found that, even if each of the scaly graphites existing inside the spherical graphite was uniformly covered, the initial resistance value of the negative electrode became higher in the case where only the spherical graphite was used as the negative electrode active substance. Therefore, a negative electrode that can implement both of decreasing the resistance and improving the durability is required.

The present disclosure has been made in view of the above described circumstances, and the main purpose is to provide a negative electrode that can implement decreasing the initial resistance of the nonaqueous electrolyte secondary battery and improving the durability. In addition, another purpose is to provide a nonaqueous electrolyte secondary battery including the above described negative electrode.

In order to implement the above described purpose, a negative electrode for nonaqueous electrolyte secondary battery herein disclosed is provided. The negative electrode herein disclosed includes a negative electrode collector and a negative electrode active substance layer that is formed on the negative electrode collector. The above described negative electrode active substance layer includes at least a first negative electrode active substance and a second negative electrode active substance. The above described first negative electrode active substance is configured with an aggregated body of a scaly graphite whose surface of at least one part is covered with a low crystalline carbon. A graphite interlayer distance of the above described low crystalline carbon based on electron diffraction images by a transmission electron microscope is equal to or more than 3.8 Å and not more than 5.0 Å. The above described second negative electrode active substance is a natural graphite or an artificial graphite whose graphite interlayer distance based on electron diffraction images by the above described transmission electron microscope is equal to or more than 3.35 Å and not more than 3.4 Å. Here, a mass ratio of the above described first negative electrode active substance and the above described second negative electrode active substance is 50:50 to 90:10.

According to the configuration described above, a state is implemented where the inside of the first negative electrode active substance is uniformly covered, and the volume expansion accompanying with the charging/discharging is suppressed on each scaly graphite configuring the first negative electrode active substance. In addition, since the state can be kept that the edge surface of the scaly graphite is suitably covered, it is possible to suppress the situation where the excessive reaction with the nonaqueous electrolyte or the like occurs so as to increase the resistance of the negative electrode. In addition to this, using the second negative electrode active substance whose graphite interlayer distance is within the predetermined range can improve the ion diffusion property and can suppress the initial resistance value of the negative electrode. Therefore, it is possible to decrease the initial resistance of the nonaqueous electrolyte secondary battery, and further to implement the negative electrode that can improve the durability.

In one suitable aspect of the negative electrode herein disclosed, the above described negative electrode active substance layer includes a peak $P_L$ on a side having a relatively large fine hole diameter and a peak $P_S$ on a side having a relatively small fine hole diameter, on a Log differential pore volume distribution measured by a mercury penetration method. A ratio (L/S) of a peak area L occupied by the above described peak $P_L$ with respect to a peak area S occupied by the above described peak $P_S$ is 10.5 to 11.5.

According to the configuration described above, the voids capable of existing inside the negative electrode active substances and the voids capable of existing between the negative electrode active substance particles are suitably adjusted, and thus it is possible to implement decreasing the resistance of the nonaqueous electrolyte secondary battery and improving the durability at the higher level.

In order to implement the above described another purpose, a nonaqueous electrolyte secondary battery herein disclosed is provided. One suitable aspect of the nonaqueous electrolyte secondary battery herein disclosed is a nonaqueous electrolyte secondary battery provided with an electrode body having a positive electrode and a negative electrode, and with a nonaqueous electrolyte. It is characterized by including the above described negative electrode. Additionally, in one suitable aspect, the above described nonaqueous electrolyte includes an oxalate complex chemical compound and/or carbonates as a coating film forming agent.

Using the negative electrode including the above described characteristics as the negative electrode of the nonaqueous electrolyte secondary battery can decrease the initial resistance and can suppress the resistance increasing rate. In addition, including the coating film forming agent in the nonaqueous electrolyte that can suitably form the SEI (Solid Electrolyte Interface) membrane can further suppress the resistance increasing rate.

DETAILED DESCRIPTION OF THE PREFERRED EMBODIMENTS

Below, appropriately by reference to the accompanying drawings, a suitable embodiment of the technique herein disclosed will be explained. Incidentally, the matters other than matters particularly mentioned in this specification, and required for practicing the present invention (for example, a general configuration and construction process of a nonaqueous electrolyte secondary battery) can be grasped as design matters of those skilled in the art based on the related art in the present field. The technique herein disclosed can be executed based on the contents disclosed in the present specification, and based on the technical common sense in the present field. Additionally, in the following accompanying drawings, the members/parts providing the same effect are given the same numerals and signs, and an overlapped explanation might be omitted or simplified. In addition, the dimensional relation (length, width, height, or the like) does not reflect the actual dimensional relation. Incidentally, the phrase "A to B (it should be noted that A and B are arbitrary values)" showing a range in the present specification means a content being equal to or more than A and not more than B.

In the present specification, the wording "nonaqueous electrolyte secondary battery" represents general electric storage devices that use nonaqueous type electrolytes as for the electrolytes so as to be capable of repeatedly charging and discharging, and is a term including a storage battery and an electric storage element. The electric storage element includes such as an electric double layer capacitor. The wording "electrode active substance (in other words, positive electrode active substance or negative electrode active substance)" means a chemical compound that can reversibly store and discharge chemical species being electric charge carriers (e.g., lithium ion in the lithium ion secondary battery).

The negative electrode for nonaqueous electrolyte secondary battery herein disclosed includes a negative electrode current collector and a negative electrode active substance layer that is formed on the negative electrode current collector. This negative electrode active substance layer includes a first negative electrode active substance and a second negative electrode active substance. Although not intending to particularly restrict, it will be described below in details about a technique herein disclosed with an example of a lithium ion secondary battery including a wound electrode body formed in a flat shape and a nonaqueous electrolyte, as one embodiment.

Figure 1:
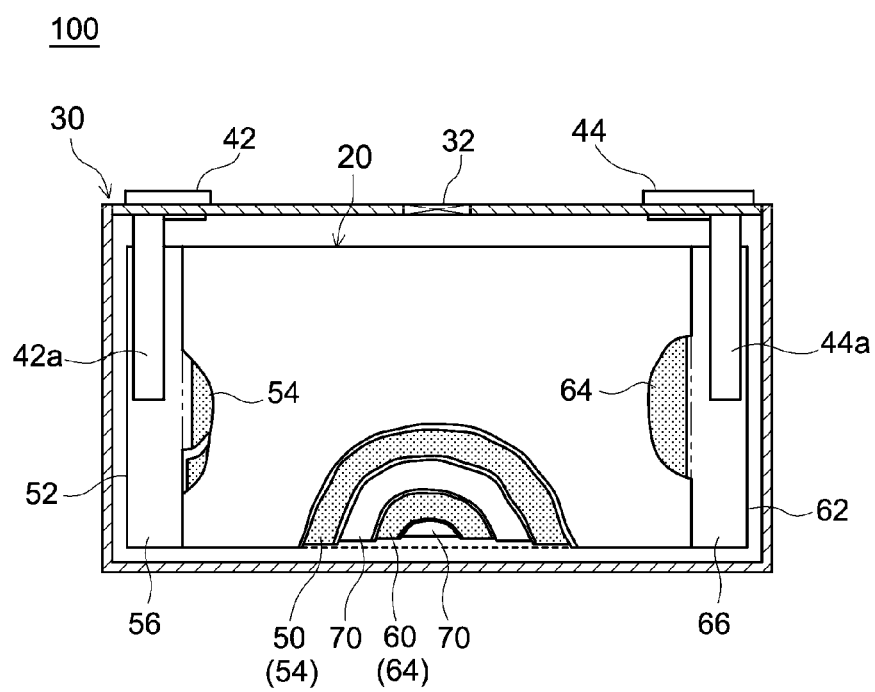
FIG. 1 is a view schematically showing a lithium ion secondary battery in accordance with an embodiment.
Figure 2:
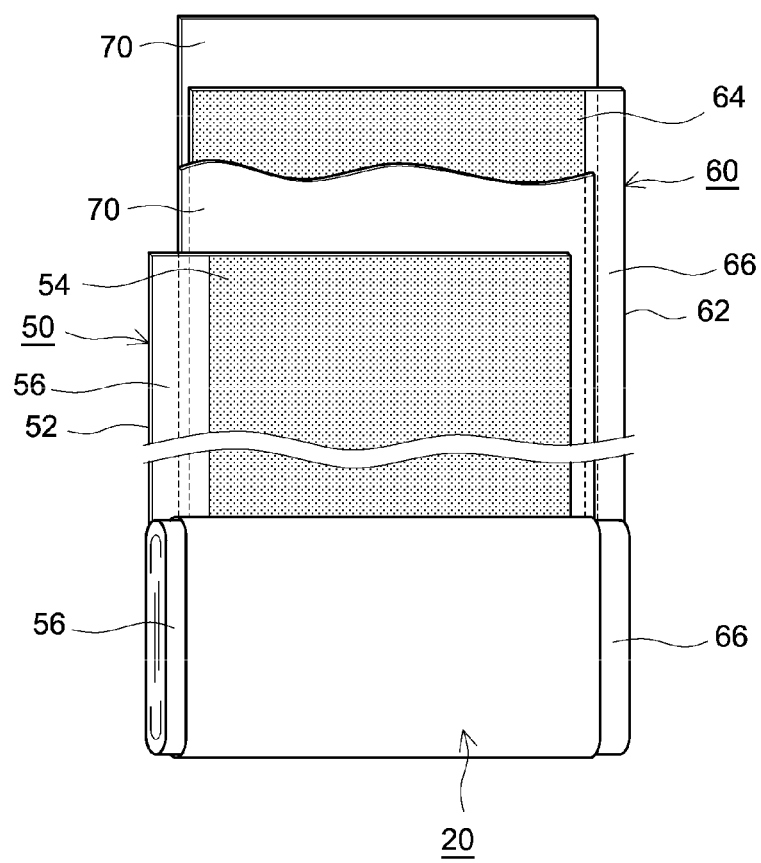
FIG. 2 is a view schematically showing a configuration of the lithium ion secondary battery in accordance with the embodiment.

A lithium ion secondary battery 100 shown in FIG. 1 is constructed to accommodate a wound electrode body 20 formed in a flat shaped and a nonaqueous electrolyte (not shown) in a battery case 30 formed in a box-shape that can be sealed. The battery case 30 is provided with a positive electrode terminal 42 and negative electrode terminal 44 for external connection, and with a thin-walled safety valve 32 that is set to release the internal pressure of the battery case 30 when the internal pressure rises to a predetermined level or more. In addition, the battery case 30 is provided with an injection port (not shown) for injecting the nonaqueous electrolyte. The positive electrode terminal 42 and a positive electrode collector plate 42a are electrically connected. The negative electrode terminal 44 and a negative electrode collector plate 44a are electrically connected. As for the material of the battery case 30, a metal material having a high strength, being lightweight, and having a good thermal conductivity is preferable, and for example, aluminum, steel, or the like can be obtained as this kind of metal material.

The wound electrode body 20 typically includes a form in which a positive electrode 50 formed in a long sized sheet-shape and a negative electrode 60 formed in a long sized sheet-shape are superimposed via a separator 70 formed in a long sized sheet-shape and then the superimposed resultant is wound in the long axis direction. The positive electrode 50 includes a configuration in which a positive electrode active substance layer 54 is formed along the long axis direction on one surface or both surfaces of the positive electrode current collector 52 formed in a long sized sheet-shape. The negative electrode 60 includes a configuration in which a negative electrode active substance layer 64 is formed along the long axis direction on one surface or both surfaces of the negative electrode current collector 62 formed in a long sized sheet-shape. To a positive electrode active substance layer non-formation portion 56 (in other words, a portion where the positive electrode active substance layer 54 is not formed and thus the positive electrode collector 52 is exposed) and a negative electrode active substance layer non-formation portion 66 (in other words, a portion where the negative electrode active substance layer 64 is not formed and thus the negative electrode collector body 62 is exposed) that are formed to be externally protruding from the both ends of the wound electrode body 20 in the wound axis direction, a positive electrode collector plate 42a and a negative electrode collector plate 44a are respectively joined.

The positive electrode 50 includes the positive electrode active substance layer 54 on the positive electrode collector 52 formed in the long sized sheet-shape. As the positive electrode collector 52, for example, metal materials having favorable electrically conductive properties, such as aluminum, nickel, titanium, and stainless steel, can be used. Among them, aluminum (for example, aluminum foil) is particularly preferable. Although not particularly restricted, the thickness of the positive electrode collector 52 is, for example, equal to or more than 5 µm and not more than 35 µm, or preferably equal to or more than 7 µm and not more than 20 µm.

The positive electrode active substance included in the positive electrode active substance layer 54 is not particularly restricted, and 1 kind or 2 or more kinds of materials conventionally and generally utilized as the positive electrode active substance of the nonaqueous electrolyte secondary battery, particularly lithium ion secondary battery, can be used. As the positive electrode active substance, for example, lithium composite oxide, lithium transition metal phosphate compound (for example, $LiFePO_4$), and the like can be used. As for examples of the lithium composite oxide, lithium nickel type composite oxide, lithium cobalt type composite oxide, lithium manganese type composite oxide, lithium nickel manganese type composite oxide (for example, $LiNi_{0.5}Mn_{1.5}O_4$), lithium nickel manganese cobalt type composite oxide (for example, $LiNi_{1/3}Co_{1/3}Mn_{1/3}O_2$), and the like can be obtained.

Although not particularly restricted, the average particle diameter of the positive electrode active substance might be approximately equal to or more than about 0.5 µm and not more than 50 µm, or typically equal to or more than 1 µm and not more than 20 µm. Incidentally, in the present specification, the wording "average particle diameter" represents a particle diameter (which might be referred to as D50, or median diameter) corresponding to cumulative frequency 50 volume % from the microparticle side having a smaller particle diameter in the volume reference based particle size distribution based on a general laser-diffraction/light-scattering method.

The positive electrode active substance layer 54 might include a substance other than the positive electrode active substance, for example, an electrically conductive agent, binder, or the like. As for the electrically conductive agent, for example, carbon black, such as acetylene black (AB), or another carbon material (graphite, or the like) can be used preferably. As for the binder, for example, a fluorine type binder, such as polyvinylidene fluoride (PVdF) and polytetrafluoroethylene (PTFE), or a rubber type binder, such as styrene butadiene rubber (SBR), can be used preferably. In addition, if the effect of the present disclosure is not deteriorated, the positive electrode active substance layer 54 might include a material other than the above described material (for example, various additive agent, or the like).

It is preferable from the perspective of the energy density that the content amount of the positive electrode active substance in the positive electrode active substance layer 54 (in other words, a rate of the positive electrode active substance with respect to the total mass of the positive electrode active substance layer) is approximately equal to or more than 60 mass %. For example, the range of 75 mass % to 99 mass % is more preferable, and the range of 80 mass % to 95 mass % is more preferable. In addition, for the content amount of the electrically conductive agent in the positive electrode active substance layer 54, for example, the range of 1 mass % to 10 mass % is preferable, and the range of 1 mass % to 8 mass % is more preferable. For the content amount of the binder in the positive electrode active substance layer 54, for example, the range of 0.5 mass % to 5 mass % is preferable, and the range of 1 mass % to 3 mass % is more preferable. Additionally, in the case where various additive agents, such as a thickening agent, are included, for the content amount of the additive in the positive electrode active substance layer 54, for example, the range equal to or less than 7 mass % is preferable, and the range equal to or less than 5 mass % is more preferable.

The negative electrode 60 includes the negative electrode active substance layer 64 on the negative electrode collector 62 formed in the long sized sheet-shape. As the negative electrode collector 62 is configured with a metal material, for example, copper having a favorable electric conductive property, alloy whose main component is copper, nickel, titanium, stainless steel, or the like. Among them, particularly, copper (for example, copper foil) can be preferably selected. The thickness of the negative electrode collector 62 might be, for example, approximately 5 µm to 20 µm, or preferably 8 µm to 15 µm.

Figure 3:
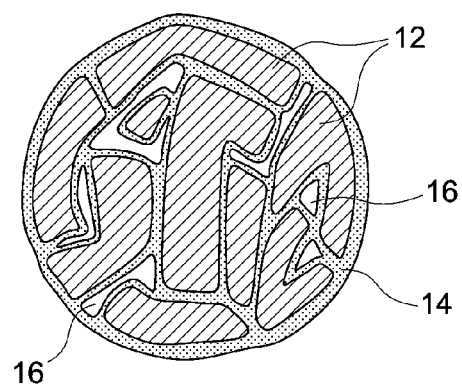
FIG. 3 is a view schematically showing a first negative electrode active substance in accordance with the embodiment.

The negative electrode active substance layer 64 includes at least a first negative electrode active substance and a second negative electrode active substance. As shown in FIG. 3, the first negative electrode active substance 10 is configured with an aggregated body of scaly graphites 12, and the surface of at least one part of the scaly graphite 12 is covered with a low crystalline carbon 14. Between the scaly graphites 12 provided with the cover of the low crystalline carbon 14, a void 16 is present (inside-particle void). It is preferable that the shape of the first negative electrode active substance 10 is typically an approximately spherical shape. In one suitable aspect, it is an approximately spherical shape for which the above described scaly graphite 12 is subjected to stress and spheroidized. In other words, the first negative electrode active substance 10 might be the so-called spherical graphite. Incidentally, the wording "approximately spherical shape" in the present specification contains even a spherical shape, a rugby ball shape, a polyhedron shape, and the like, and represents a shape whose average aspect ratio (ratio of the length in the long axis direction with respect to the length in the short axis direction, in the minimum rectangle circumscribing to the particle) is approximately equal to or more than 1 and not more than 2, for example, equal to or more than 1 and not more than 1.5. As for the aspect ratio, it is possible to use an arithmetic average value of the length in the long axis direction with respect to the length in the short axis direction in the minimum rectangles circumscribing to 50 or more active substance particles selected from a plurality of (for example, 2 or more) observation images obtained by an electron microscope.

The low crystalline carbon 14 covers the surface of at least one part of the scaly graphite 12. It is enough on the scaly graphite 12 that the surface of at least one part is covered by the low crystalline carbon 14, but it is preferable that the entire surface of the scaly graphite 12 is covered. Although not particularly restricted, the average thickness of the cover of the low crystalline carbon 14 might be, for example, equal to or more than 1 nm and not more than 50 nm, or might be equal to or more than 5 nm and not more than 40 nm.

Incidentally, as the average thickness described above, it is possible to use an arithmetic average value of the thicknesses at 50 or more positions selected from a plurality of (for example, 2 or more) observation images obtained by an electron microscope (for example, a transmission electron microscope).

The scaly graphite 12 is one kind of scale shaped graphites among the natural graphites, whose appearance is a thin scaly shape (thin sheet-shape). The scaly graphite 12 has the highest crystallinity of graphite among various graphite materials. For example, on the complete graphite crystal, the graphite interlayer distance (lattice plane interval of d(002) surfaces) based on the X-ray diffraction method is generally 3.354 Å, and the crystallinity of graphite tends to develop more and the theoretical value of electric discharge capacity tends to become higher if the graphite interlayer distance is closer to 3.354 Å.

Although the property of the scaly graphite 12 is not particularly restricted, for example, the average particle diameter might be equal to or more than 1 μm and not more than 100 μm, or might be equal to or more than 5 μm and not more than 50 μm. The true density of the scaly graphite 12 might be equal to or more than 2 g/cm$^3$ and not more than 3 g/cm$^3$, or might be equal to or more than 2.1 g/cm$^3$ and not more than 2.8 g/cm$^3$. The scaly graphite 12 as described above might be prepared by purchasing a commercially available product.

The low crystalline carbon 14 has a lower crystallinity of graphite, and typically the graphite interlayer distance (lattice plane interval of d(002) surfaces) is equal to or more than 3.8 Å and not more than 5.0 Å. The graphite interlayer distance might be equal to or more than 3.8 Å, might be equal to or more than 3.9 Å, or might be equal to or more than 4.0 Å. When the graphite interlayer distance is less than 3.8 Å, the low crystalline carbon 14 of the technique herein disclosed has the too high crystallinity of graphite and thus is in a rigid state (in other words, a state where the flexible property is insufficient), and thus there is a tendency that a clear interface is formed between the scaly graphites 12. Thus, when volume expansion occurs on the scaly graphite 12 due to the charging/discharging, there are some fears that the low crystalline carbon 14 fails to follow and is separated. This would induce reduction in the expansion suppressing effect and in the resistance increase suppressing effect of the negative electrode, and thus this is not preferable.

On the other hand, the graphite interlayer distance of the low crystalline carbon 14 might be equal to or less than 5.0 Å, might be equal to or less than 4.8 Å, or might be equal to or less than 4.5 Å. When the graphite interlayer distance exceeds 5.0 Å, Van der Waals force with the distance does not induce effects between the graphite layers and thus it is difficult to manufacture such a carbon material. In addition, it is possible to form a carbon material that has a random orientation irregularly arranging the graphite interlayer distances exceeds 5.0 Å, but the electric conductive property is low since the π-conjugate fails to have been developed, and thus it is not preferable as the battery material (negative electrode active substance).

In the present specification, the "graphite interlayer distance (lattice plane interval of d(002) surfaces)" can be obtained on the basis of the electron diffraction image by the transmission electron microscope (transmission electron microscope (TEM) or scanning transmission electron microscope (STEM)). In particular, a transmission electron microscope is used to obtain a plurality of (for example, 5 or more) electron diffraction images of the negative electrode active substances. The magnification of the transmission electron microscope is not particularly restricted if the electron diffraction images can be obtained, but it is preferable that the magnification is, for example, equal to or more than 2 million times. In the electron diffraction image, the distance of layers having lattice patterns derived from the graphite crystal (lattice point distance) is measured and then the average of these values is obtained so that the "graphite interlayer distance (lattice plane interval of d(002) surfaces)" in the present specification can be calculated.

Incidentally, the graphite interlayer distance (lattice plane interval of d(002) surfaces) of the graphite having a high crystallinity (for example, popular natural graphite, artificial graphite, or the like) can be obtained by the X-ray diffraction method. However, in the technique herein disclosed, it has been difficult to calculate the graphite interlayer distance by the X-ray diffraction method because the crystallinity of the low crystalline carbon is low and further the cover of the low crystalline carbon is several nm to several tens of nm. Thus, the value calculated by the above described measuring method is used as the graphite interlayer distance in the present specification.

The first negative electrode active substance 10, configured with the aggregated body of the scaly graphites 12 including the cover of the low crystalline carbon 14 as described above, can be manufactured, for example, as described below.

At first, a graphite substance material (typically, a scaly graphite) and a precursor of the low crystalline carbon are prepared. As for the precursor of the low crystalline carbon, materials capable of being carbonized can be obtained such as various pitches (for example, petroleum pitch, coal tar pitch, naphtha pitch, or the like), organic polymer chemical compounds (for example, phenol resin, cellulose resin, poly vinyl alcohol, polyamide resin, or the like), or the like. One kind of them can be used alone, or 2 or more kinds of them can be combined so as to be used.

Then, the graphite substance material and the precursor of the low crystalline carbon are mixed. The resultant mix powder is baked at the softening point of the precursor of the low crystalline carbon (for example, 300° C. or more) to melt the precursor so as to stick the melted precursor on the surface of the graphite substance material. In a state where the precursor sticks, the resultant is baked under an inert gas atmosphere at further high temperature (for example, 600° C. to 1000° C.) so as to be capable of obtaining the carbon powder including the cover derived from the precursor of the low crystalline carbon, the cover being formed on at least one part of the surface of the graphite substance material.

The obtained carbon powders described above are granulated, while being rolled, to make respective powders (particles) be firmly and closely bonded, so as to be capable of obtaining spheroidized graphite particle (first negative electrode active substance 10). The granulating apparatus is not particularly restricted, if including a mechanism for rolling particles and for adding impact on the particle. For example, a ball mill, a bead mill, a hybridization system made by Nara Machinery, Nobiruta made by Hosokawa Micron, a FM mixer made by Nippon Coke & Engineering, composite, or the like can be obtained.

Generally, the graphite has a highly reactive surface referred to as edge surface. Typically, the edge surface is end part of the basal surface of the graphite. On the spherical graphite, typically, the edge surface described above is folded and incurvated. Thus, it is possible to suppress the capacity decrease and resistance increase of the battery that may occur due to the reaction of the edge surface with the nonaqueous electrolyte (typically, reductive decomposition reaction). In addition, due to spheroidizing, it is possible to make the orientation property of the graphite be smaller and thus possible to homogenize the electric conductive property in the negative electrode active substance layer 64.

In addition to this, on the technique herein disclosed, the low crystalline carbon 14 covers the surface of at least one part of the scaly graphite 12 configuring the first negative electrode active substance 10. Thus, not only on the surface of the first negative electrode active substance 10 but also inside the first negative electrode active substance 10 (in other words, each of the scaly graphites 12 configuring the first negative electrode active substance 10), a state is kept that the edge surfaces are suitably covered. Therefore, even inside the first negative electrode active substance 10, it is possible to suitably suppress the edge surface from excessively reacting with the nonaqueous electrolyte. Furthermore, as described above, the scaly graphite 12 is covered with the low crystalline carbon 14 and then spheroidized, so as to be capable of reducing the void 16 inside the first negative electrode active substance 10. Reducing the voids 16 so as to increase the bind force of the low crystalline carbons 14 to each other would increase the total binding force of the first negative electrode active substance 10. Thus, it is possible to suppress the expansion of the negative electrode 60. In addition, reducing the voids 16 inside the first negative electrode active substance 10 would improve the electric conductive property in comparison to the conventional one. According to the above described configuration, it is possible to implement the resistance decrease and durability improvement of the nonaqueous electrolyte secondary battery.

The second negative electrode active substance is, typically, a natural graphite or artificial graphite whose graphite interlayer distance (lattice plane interval of d(002) surfaces) based on the electron diffraction images obtained by the transmission electron microscope is equal to or more than 3.35 Å and not more than 3.40 Å. As for the second negative electrode active substance, it is possible to preferably use one that various graphites, such as natural graphite and artificial graphite, are processed (crush, spherical formation, or the like) to be formed in particle shapes (spherical shape). For example, the second negative electrode active substance could be one in which the scaly graphite is spheroidized. As the method for processing the various graphites to have the particle shape, a conventionally well known method can be applied, without being particularly restricted. The natural graphite or artificial graphite as described above can be obtained at relatively low price, and thus it is preferably used even from the cost perspective.

Although not particularly restricted, the average particle diameter of the second negative electrode active substance might be approximately equal to or more than 1 μm and not more than 30 μm, or might be, for example, equal to or more than 5 μm and not more than 15 μm.

The graphite interlayer distance (lattice plane interval of d(002) surfaces) of the second negative electrode active substance based on the electron diffraction images by the transmission electron microscope is equal to or more than 3.35 Å and not more than 3.40 Å. In the case where the graphite interlayer distance is less than 3.35 Å, the inert passage for the lithium ion becomes narrower and the reaction resistance related to the ion insertion could be significantly reduced. Additionally, in the case where the graphite interlayer distance exceeds 3.40 Å, the graphite interlayer distance is wide even before the charge, the second negative electrode active substance tends to be bulky, and thus there are some fears of reducing the energy density of the negative electrode 60. The second negative electrode active substance has the graphite interlayer distance as described above (in other words, has a high crystallinity of graphite), and thus could become to have a higher electric discharge capacity. In addition, since the crystallinity of graphite is higher, it could keep a state where the electron conduction and ion transportation in the active substance is suitably performed (a state where the ion diffusion property is high).

If having a graphite interlayer distance within the range described above, the second negative electrode active substance is not particularly restricted. The second negative electrode active substance as described above might be manufactured by a conventionally well known method or be prepared by purchasing a commercially available product.

The mass basis compounding ratio of the first negative electrode active substance 10 and second negative electrode active substance in the negative electrode active substance layer 64 is typically the first negative electrode active substance:the second negative electrode active substance=50:50 to 90:10. In the case where the first negative electrode active substance 10 is less than 50 mass %, the expansion suppressing effect and resistance increase suppressing effect of the negative electrode 60 induced by including the cover of the low crystalline carbon 14 described above become lower and thus the durability of the nonaqueous electrolyte secondary battery is reduced. On the other hand, in the case where the first negative electrode active substance 10 exceeds 90 mass %, the rate of the first negative electrode active substances 10 including insufficient voids becomes too higher, and thus it could be difficult to obtain the resistance decrease effect induced by the second negative electrode active substance having the high ion diffusion property so as to make the resistance value (particularly, the initial resistance value) become higher as the result. Therefore, making the first negative electrode active substance and the second negative electrode active substance have the compounding ratio in the range described above can implement the nonaqueous electrolyte secondary battery in which the durability is improved and the initial resistance value is decreased.

The negative electrode active substance layer 64 can be made to include a material capable of been used as the configuration component of the negative electrode active substance layer in a general nonaqueous electrolyte secondary battery, in addition to the above described negative electrode active substance, as needed. For an example of the material as described above, a binder and various additive agents can be obtained. As the binder, for example, styrene butadiene rubber (SBR) or the like can be used. In addition, various additive agents, such as a thickening agent, a dispersing agent, and an electrically conductive agent, can be used appropriately, and for example, as for the thickening agent, carboxy methyl cellulose (CMC), methyl cellulose (MC), or the like can be used suitably.

It is preferable from the perspective of the energy density that the content amount of the negative electrode active substance in the negative electrode active substance layer 64 is approximately equal to or more than 60 mass %. For example, the range of 90 mass % to 99 mass % is more preferable and the range of 95 mass % to 99 mass % is more preferable. Additionally, in the case where the binder is used, it is preferable that the content amount of the binder in the negative electrode active substance layer 64 is, for example, 1 mass % to 10 mass % and it is more preferable that the content amount is 1 mass % to 5 mass %. In the case where the thickening agent is used, it is preferable that the content amount of the thickening agent in the negative electrode active substance layer 64 is, for example, 1 mass % to 10 mass % and it is more preferable that the content amount is 1 mass % to 5 mass %.

The negative electrode active substance layer 64 of the negative electrode 60 used for the nonaqueous electrolyte secondary battery herein disclosed has a peak $P_L$ on a side having a relatively large fine hole diameter and has a peak $P_S$ on a side having a relatively small fine hole diameter in the Log differential pore volume distribution measured by the mercury penetration method. It is preferable that the ratio (L/S) of the peak area L occupied by the peak $P_L$ with respect to the peak area S occupied by the peak $P_S$ is 10.5 to 12.0, and it is more preferable that the ratio (L/S) is 10.5 to 11.5.

Although described later in detail, the total capacity of the voids generated between the particles in the negative electrode active substance layer 64 (in other words, outside-particle void) can be grasped as the area L occupied by the peak $P_L$ representing that the fine hole diameter is relatively larger on the Log differential pore volume distribution. In addition, the total capacity of the voids existing inside the respective particles (in other words, inside-particle void) in the negative electrode active substance layer 64 can be grasped as the area S occupied by the peak $P_S$ representing that the fine hole diameter is relatively smaller on the Log differential pore volume distribution. Therefore, it represents that the higher ratio (L/S) of the peak area L occupied by the peak $P_L$ with respect to the peak area S occupied by the peak $P_S$ indicates the less inside-particle voids on each particle (negative electrode active substance). Based on the result that the present inventor intensively studied, it is possible to implement decreasing the resistance and improving the durability of the nonaqueous electrolyte secondary battery by adjusting to make the balance of the inside-particle void and outside-particle void be within a range described above. The balance of the inside-particle void and outside-particle void can be adjusted, for example, by the property of each negative electrode active substance or by the compounding ratio of the first negative electrode active substance and second negative electrode active substance.

The capacity of the void (fine hole) on the above described negative electrode active substance layer 64 can be measured, for example, by using a mercury porosimeter (mercury porosimeter). The mercury porosimeter is an apparatus that measures the fine hole distribution of the porous bodies by the mercury penetration method. For example, a plurality of samples are cut off from the negative electrode 60 and the mercury porosimeter is used on these samples, so as to measure the capacity of the void on the negative electrode active substance layer 64. In the mercury penetration method, at first, the sample is evacuated so as to be soaked in the water silver. When the pressure applied to the water silver is increased in this state, the water silver gradually invades into a small space (for example, void or the like in the negative electrode active substance layer 64). Then, it is possible to obtain the capacity of the void in the negative electrode active substance layer 64 based on the relation between the amount of the water silver invading into the negative electrode active substance layer 64 and the pressure applied to the water silver.

The total capacity of the outside-particle void in the negative electrode active substance layer 64 and the total capacity of the inside-particle void in the negative electrode active substance layer 64 can be grasped from the fine hole capacity distribution measured with, for example, the above described mercury porosimeter. In the technique herein disclosed, the Log differential pore volume distribution measured with the mercury porosimeter (the graph showing a relation between the Log differential pore volume and the fine hole diameter) includes the peak $P_L$ on the side having the relatively large fine hole diameter and includes the peak $P_S$ on the side having the relatively small fine hole diameter. Here, it is estimated that the peak $P_L$ representing that the fine hole diameter is relatively larger results from the void (outside-particle void) generated among the particles (typically, between the negative electrode active substances) in the negative electrode active substance layer 64. In this case, the total capacity of the outside-particle void in the negative electrode active substance layer 64 can be grasped with the peak area L (integrated porous volume) occupied by the peak $P_L$ representing that the fine hole diameter is relatively larger on the Log differential pore volume distribution. Although not particularly restricted, it is preferable that the fine hole capacity integrated value within the range where the Log fine hole diameter is approximately 1 μm to 20 μm (for example, 1 μm to 10 μm) is used as the peak area L occupied by the peak $P_L$. In addition, it is estimated that the peak $P_S$ representing the fine hole diameter is relatively smaller results from the void (inside-particle void) generated in the each inside of the particle (typically, negative electrode active substance particle) in the negative electrode active substance layer 64. In this case, the total capacity of the inside-particle void in the negative electrode active substance layer 64 can be grasped with the peak area S (integrated porous volume) occupied by the peak $P_S$ representing that the fine hole diameter is smaller on the Log differential pore volume distribution. Although not particularly restricted, it is preferable that the fine hole capacity integrated value within the range where the Log fine hole diameter is approximately 0.01 μm to 1 μm is used as the peak area S occupied by the peak $P_S$.

In other words, the ratio of the total capacity of the outside-particle void and the total capacity of the inside-particle void can be grasped with the ratio (L/S) of the peak area L occupied by the peak $P_L$ with respect to the peak area S occupied by the peak $P_S$. The H point where the Log fine hole diameter has the minimum value between 2 peaks $P_L$ and $P_S$ might be set as the boundary for the 2 peaks $P_L$ and $P_S$. Additionally, in the case where the minimum value of the Log fine hole diameter is a broad peak (for example, the difference is not more than 0.01 cm³/g), the area in the peak where the difference is not more than 0.01 cm³/g is extracted, and the boundary H might be decided on the basis of the ratio of the half-value width of the peak $P_L$ and the half-value width of the peak $P_S$.

As for the separator 70, it is enough to use a material that can insulate the positive electrode active substance layer 54 and the negative electrode active substance layer 64. The separator 70 might has a nonaqueous electrolyte hold function and/or a shutdown function. The suitable example of the separator 70 is, for example, a porous sheet (film) consisted of a resin, such as polyethylene (PE), polypropylene (PP), polyester, cellulose, and polyamide. Among them, on a polyolefin type porous sheet, such as PE and PP, the shutdown temperature is 80 to 140 which is sufficiently lower than the heat resistant temperature (typically, 200° C. or more) of the battery, thus the shutdown function can be implemented at an appropriate timing, and therefore it is preferable. The porous sheet described above might have a single layer structure, or might have a laminate structure of two or more layers (for example, three layers structure in which a PP layer is laminated on both surfaces of the PE layer). The separator 70 might be provided with a heat resistant layer (HRL).

Although not particularly restricted, it is preferable that the thickness of the separator 70 is approximately equal to or more than 10 μm (typically, equal to or more than 15 μm, or for example, equal to or more than 20 μm) and not more than 40 μm (typically, not more than 35 μm, or for example, not more than 30 μm). In the case where the average thickness of the separator 70 is within the range described above, the ion permeable property becomes more favorable and the minute short circuit (leakage current) is hardly caused. Thus, it is possible to implement the input and output density and the durability at the higher level.

In the case where the separator 70 includes the heat resistant layer (HRL), even if the above described minute short circuit progresses to induce the high temperature (typically, 150° C. or more, or for example, 200° C. or more) in the battery, the separator 70 hardly softens and hardly melts (a little deformation is allowable) so as to be capable of keeping the shape. The heat resistant layer described above typically includes inorganic fillers and a binder. As the inorganic tillers, for example, it is possible to use the inorganic oxide, such as alumina, boehmite, silica, titania, magnesia, zirconia, nitride boron, and nitride aluminum. As the binder, for example, it is possible to use the various materials illustrated as the binders included in the above described positive electrode active substance layer 54 and negative electrode active substance layer 64.

Although not particularly restricted, the thickness of the heat resistant layer might be approximately equal to or more than 1 μm and not more than 10 μm, or for example, might be equal to or more than 2 μm and not more than 8 μm. If the heat resistant layer has the thickness within the range described above, it is possible to suitably inhibit the inside short circuit and possible to implement the higher short circuit inhibition effect. The heat resistant layer might be formed on the surface at the side opposed to the positive electrode 50 of the separator 70, and/or on the surface at the side opposed to the negative electrode 60. In one suitable aspect, the heat resistant layer is formed on the surface at the side opposed to the positive electrode 50 of the separator 70. Thus, the nonaqueous electrolyte is suitably kept at the interface with the separator 70 so as to be capable of improving the output characteristic of the secondary battery.

As for the nonaqueous electrolyte, typically, a liquid (nonaqueous electrolyte) is used in which a supporting salt (for example, lithium salt, sodium salt, magnesium salt, or the like; or lithium salt if in the case of the lithium ion secondary battery) is dissolved or dispersed into the nonaqueous solvent. Or, it is possible to use a solid state (typically, the so-called gel state) material in which a polymer is added to the nonaqueous electrolyte.

As the supporting salt, a conventional supporting salt used for this kind of nonaqueous electrolyte secondary battery can be used, without particular restriction. For example, it is possible to use the lithium salt, such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$. Among them, it is preferable to use $LiPF_6$. The concentration of the supporting salt might be, for example, equal to or more than 0.7 mol/L and not more than 1.3 mol/L.

As for the nonaqueous solvent, it is possible to use a nonaqueous solvent of carbonates, esters, ethers, nitriles, sulfones, lactones, or the like, without particular restriction. Particularly, it is preferable to use a nonaqueous solvent of ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), or the like. One kind of these nonaqueous solvents can be used alone, or 2 or more kinds of them are appropriately combined so as to be used.

In one suitable aspect, a coating film forming agent is included in the nonaqueous electrolyte. As for the coating film forming agent, it is possible to use various chemical compounds that are typically decomposed at the voltage lower than the other components of the nonaqueous electrolyte (for example, nonaqueous solvent) to form the SEI membrane on the surface of the electrode active substance (typically, negative electrode active substance). Incidentally, since the coating film forming agent is typically decomposed on the surface of the electrode active substance during the initial charging, the coating film forming agent does not keep the original form in the secondary battery after the initial charging/discharging.

As for the suitable example of the coating film forming agent, for example, it is possible to obtain an oxalate complex chemical compound and/or carbonates. As for the oxalate complex chemical compound, for example, it is possible to obtain the (oxalate)borate represented by lithium-bis(oxalate)borate (LiBOB) or the like, the fluoro (oxalate)borate represented by lithium difluoro(oxalate)borate or the like, the (oxalate)phosphate represented by lithium-tris(oxalate)phosphate or the like, and the like. As the carbonates, for example, it is possible to obtain vinylene carbonate (VC), vinyl ethyl carbonate, methyl phenyl carbonate, fluoroethylene carbonate, and the like. The nonaqueous electrolyte might include only 1 kind of the coating film forming agents described above or might include 2 or more kinds of them. Among them, LiBOB is preferable because forming a particularly suitable SEI membrane. The concentration of the coating film forming agent in the nonaqueous electrolyte might be equal to or more than 0.1 mass %, or might be equal to or more than 0.3 mass %, from the perspective for properly suppressing the decomposition of the solvent. On the other hand, from the perspective for suppressing the coating film forming agent from remaining after the initial charging/discharging, the concentration equal to or less than 3 mass % is preferable, the concentration equal to or less than 2 mass % is more preferable, and the concentration equal to or less than 1.5 mass % is furthermore preferable. Incidentally, the nonaqueous electrolyte can include various additive agents, such as overcharge preventing agent and antifreezing agent, in addition to the coating film forming agent.

In the technique herein disclosed, there is a state where each of the edge surfaces of the scaly graphites 12 configuring the first negative electrode active substance 10 is covered with the low crystalline carbon 14. Thus, even if the nonaqueous electrolyte osmoses inside the first negative electrode active substance 10, it is possible to suppress the edge surfaces and the nonaqueous electrolyte from being reacted inside the first negative electrode active substance 10, and to suppress the SEI membrane from being excessively formed. Therefore, it is possible to suppress the resistance increase of the negative electrode due to the excessive formation of the SEI membrane, and possible to contribute in improving the durability of the nonaqueous electrolyte secondary battery.

The nonaqueous electrolyte secondary battery configured as described above can be utilized for various uses. The nonaqueous electrolyte secondary battery herein disclosed is characterized in that the durability is improved and the initial resistance decrease is implemented. Therefore, by utilizing the characteristics as described above, it can be suitably applied to the power source for motor (drive power supply) mounted on the vehicle, for example, plug-in hybrid vehicle (PHEV), hybrid vehicle (HEV), electric vehicle (BEV), or the like. Incidentally, the nonaqueous electrolyte secondary battery described above can be used typically in a battery pack form where plural ones are connected in series and/or in parallel.

Below, though embodiments related to the negative electrode herein disclosed are explained, it is not intended that the technique herein disclosed is restricted to these embodiments.

Preparation of First Negative Electrode Active Substance
Negative Electrode Active Substance A A scaly graphite (CNP15 made by Ito Graphite Co., Ltd.) and a coal tar pitch as the precursor of low crystalline carbon were prepared. The scaly graphite 100 mass part and the coal tar pitch 5 mass part were mixed with a roller mixer and thus a mix powder was obtained. The mix powder described above was put into an alumina crucible, and then baked it with a tubular furnace under the nitrogen atmosphere at 300° C. for 1 hour. Then, the temperature was risen under the nitrogen atmosphere and baked at 1000° C. for 1 hour (baking processing). By doing this, a carbon powder was obtained in which the low crystalline carbon covered the surface of at least one part of the scaly graphite. The carbon powder described above was fed into a ball mill, granulation was performed while the carbon powder was rolled until the carbon powder became the spherical graphite particle. By doing this, the negative electrode active substance A was obtained as the first negative electrode active substance.

Negative Electrode Active Substance B

By changing the temperature of the baking processing from the negative electrode active substance A, the negative electrode active substance B was obtained. Particularly, the mix powder of the scaly graphite 100 mass part and coal tar pitch 5 mass part was baked with the tubular furnace under the nitrogen atmosphere at 300° C. for 1 hour and then baked at 800° C. for 1 hour, with making the other processes be similar to the negative electrode active substance A, and thus the negative electrode active substance B was obtained.

Negative Electrode Active Substance C

By changing the precursor of low crystalline carbon, the negative electrode active substance C was obtained. Particularly, the scaly graphite 100 mass part and a poly vinyl alcohol 5 mass part were prepared, with making the other processes be similar to the negative electrode active substance A, and thus the negative electrode active substance C was obtained.

Negative Electrode Active Substance D

By changing the precursor of low crystalline carbon, the negative electrode active substance D was obtained. Particularly, the scaly graphite 100 mass part and a phenol resin 5 mass part were prepared, with making the other processes be similar to the negative electrode active substance A, and thus the negative electrode active substance D was obtained.

Negative Electrode Active Substance E

A natural graphite (SG-BH8 made by Ito Graphite Co., Ltd.) and the coal tar pitch as the precursor of low crystalline carbon were prepared. The spherical natural graphite 100 mass part and the coal tar pitch 5 mass part were mixed with the roller mixer and thus a mix powder was obtained. The mix powder described above was put into the alumina crucible, and then baked with a tubular furnace under the nitrogen atmosphere at 300° C. for 1 hour. Then, the temperature was risen under the nitrogen atmosphere and baked at 1000° C. for 1 hour (baking processing). By doing this, the negative electrode active substance E was obtained in which the low crystalline carbon covered the surface of the spherical natural graphite.

Negative Electrode Active Substance F

By changing the temperature of the baking processing from the negative electrode active substance A, the negative electrode active substance F was obtained. Particularly, the mix powder of the scaly graphite 100 mass part and coal tar pitch 5 mass part was baked with the tubular furnace under the nitrogen atmosphere at 300° C. for 1 hour and then baked at 2800° C. for 1 hour, with making the other processes be similar to the negative electrode active substance A, and thus the negative electrode active substance F was obtained.

Measurement of Graphite Interlayer Distance

The graphite interlayer distances of the negative electrode active substances A to F described above were measured. At first, a transmission electron microscope (JEM-ARM200F made by JEOL Ltd., TEM) was used so as to observe each of the negative electrode active substances. The cross section images of the negative electrode active substances were obtained so as to confirm whether a cover of the low crystalline carbon is present inside the active substance or not. The results are shown in Table 1.

Next, by the electron diffraction with TEM, the graphite interlayer distance (A) of the low crystalline carbon was measured. Particularly, with a transmission electron microscope, a plurality of (5) electron diffraction images of each negative electrode active substance were obtained and the distance (lattice point distance) of layers including lattice patterns derived from the graphite crystal was measured. By obtaining the average value of these lattice point distance, the graphite interlayer distance of the low crystalline carbon of each active substance was calculated. The results are shown in Table 1. Incidentally, the observe condition of TEM at that time was set to have 200 kV accelerating voltage and 2 million times or more of magnification, in order to observe the electron diffraction image.

Preparation of Second Negative Electrode Active Substance
Negative Electrode Active Substance G As for the second negative electrode active substance, a negative electrode active substance G being a natural graphite (SG-BH8 made by Ito Graphite Co., Ltd.) was prepared. The graphite interlayer distance of the negative electrode active substance G was 3.36 Å.

Negative Electrode Active Substance H

As for the second negative electrode active substance, a negative electrode active substance H being an artificial graphite (AG.B made by Ito Graphite Co., Ltd.) was prepared. The graphite interlayer distance of the negative electrode active substance H was 3.37 Å.

1. Discussion About Coating Layer

Embodiment 1

As the first negative electrode active substance, the negative electrode active substance A was used, and as the second negative electrode active substance, the negative electrode active substance G was used. The first negative electrode active substance and the second negative electrode active substance were mixed at the mass ratio 50:50. The mixture of the negative electrode active substances, the styrene butadiene rubber (SBR) as the binder, and the carboxy methyl cellulose (CMC) as the thickening agent were mixed at the mass ratio 99:0.5:0.5 with the ion exchange water as the solvent, so as to prepare the negative electrode paste. The negative electrode paste described above was applied on the both surfaces of the long sized sheet-shaped copper foil (thickness 10 μm) as the negative electrode collector, the resultant was pressed by a roll press machine after dry, and thus the sheet-shaped negative electrode was manufactured.

Embodiments 2 to 4

The negative electrodes of Embodiments 2 to 4 were manufactured similarly to Embodiment 1, except for having changed the first negative electrode active substance as shown in Table 1.

Embodiment 5

The negative electrode of Embodiment 5 was manufactured similarly to Embodiment 1, except for having used the negative electrode active substance H as the second negative electrode active substance.

Comparative Example 1

The negative electrode of Comparative example 1 was manufactured similarly to Embodiment 1, except for having used the negative electrode active substance E as the first negative electrode active substance and for using no second negative electrode active substance.

Comparative Example 2

The negative electrode of Comparative example 2 was manufactured similarly to Embodiment 1, except for having used the negative electrode active substance F as the first negative electrode active substance.

Measurement of Fine Hole Distribution of Negative Electrode

A mercury porosimeter (Auto Pore made by Micromeritics Instrument Corp.) was used to measure the fine hole distribution of the negative electrode of each example. The peak area L (integrated porous volume) occupied by the peak PL representing that the fine hole diameter is relatively larger and the peak area S (integrated porous volume) occupied by the peak PS representing that the fine hole diameter is relatively smaller on the obtained Log differential pore volume distribution were obtained and thus the ratio (L/S) of the peak area L with respect to the peak area S was calculated. The results are shown in Table 1.

Manufacture of Lithium Ion Secondary Battery for Evaluation

The $LiNi_{1/3}Co_{1/3}Mn_{1/3}O_2$ (NCM) as the positive electrode active substance, the acetylene black (AB) as the electrically conductive agent, and the polyvinylidene fluoride (PVdF) as the binder were mixed at the mass ratio of these materials being 92:5:3 with the N-methyl pyrrolidone (NMP) as the solvent, so as to prepare the positive electrode paste. The positive electrode paste described above was applied on the both surfaces of the long sized sheet-shaped aluminum foil (thickness 15 μm) as the positive electrode collector, the resultant was pressed by a roll press machine after dry, and thus the sheet-shaped positive electrode was manufactured.

As for the separator, a member provided with a heat resistant layer (HRL) at the side opposed to the positive electrode of a porous polyolefin sheet having a three layers structure of PP/PE/PP was prepared.

The manufactured sheet-shaped negative electrode (Embodiments 1 to 5 and Comparative examples 1 and 2) and the sheet-shaped positive electrode were laminated via the prepared separator, and the resultant was wound in the longitudinal direction to manufacture the wound electrode body. Next, electrode terminals were respectively attached by welding to the positive electrode sheet and negative electrode sheet of the manufactured wound electrode body, and the resultant was accommodated in the battery case including the injection port.

$LiPF_6$ at the concentration of 1.0 mol/L as the supporting salt was dissolved in a mix solvent including ethylene carbonate (EC), dimethyl carbonate (DMC), and ethyl methyl carbonate (EMC) at the volume ratio of 30:30:40 as the nonaqueous electrolyte, and the resultant was prepared. The nonaqueous electrolyte was injected from the injection port of the battery case, and then the injection port was airtightly sealed by a sealing lid. The aging processing was performed at 60° C. after this was charged, so as to obtain the lithium ion secondary battery for evaluation for each samples.

Measurement of Expansion Rate of Negative Electrode

The thickness of the negative electrode (in other words, the negative electrode after the press) of respective examples before the lithium ion secondary battery for evaluation is constructed was measured by a contact type micrometer. The thickness of the negative electrode was measured at 3 positions, the average value of them was treated as the average thickness of the negative electrode before the charge. Next, the negative electrode, the separator, and the metal lithium were laminated in this order so as to manufacture a coin cell. The coin cell described above was charged to 80% of the negative electrode active substance ratio capacity (80% SOC). The coin cell after the charge was disassembled, and the average thickness of the negative electrode after the charge was calculated, similarly to the above described method. The expansion rate of the negative electrode was calculated with the following formula: the expansion rate of the negative electrode=(the average thickness of the negative electrode after the charge/the average thickness of the negative electrode before the charge)×100. The results are shown in Table 1.

Measurement of Resistance Increasing Rate After Preservation

The lithium ion secondary battery for each evaluation (Embodiments 1 to 5 and Comparative examples 1 and 2) was adjusted to 60% SOC. This was kept under a −10° C. environment, and was charged with 15 C current value for 2 seconds, the voltage difference between just before and just after the energization at that time was divided by the energization current so as to calculate the resistance value, and this was treated as the initial resistance value. The lithium ion secondary battery for each evaluation was adjusted to be at the state of 80% SOC, then was preserved for 30 days under the 70° C. environment. The resistance value of the battery after the preservation was obtained similarly to the initial resistance value, and then the resistance increasing rate after the preservation was calculated with the following formula: the resistance increasing rate=(resistance value after the preservation test/initial resistance value)×100. Incidentally, the result shown in Table 1 is a resistance increasing rate in the case where the initial resistance value of each example was set to be 100.

TABLE 1

| | First negative electrode active substance | Second negative electrode active substance | Compounding ratio (mass %) First active substance | Compounding ratio (mass %) Second active substance | Low crystalline carbon Presence or absence inside cctive substance | Graphite interlayer distance (Å) | L/S | Negative electrode expansion rate (%) | post-preservation resistance increasing rate (%) |
|---|---|---|---|---|---|---|---|---|---|
| Embodiment 1 | Negative electrode active substance A | Negative electrode active substance G | 50 | 50 | Presence | 3.8 | 10.9 | 108 | 105 |
| Embodiment 2 | Negative electrode active substance B | Negative electrode active substance G | 50 | 50 | Presence | 4.0 | 11.0 | 107 | 103 |
| Embodiment 3 | Negative electrode active substance C | Negative electrode active substance G | 50 | 50 | Presence | 4.5 | 10.8 | 105 | 102 |
| Embodiment 4 | Negative electrode active substance D | Negative electrode active substance G | 50 | 50 | Presence | 4.8 | 10.9 | 104 | 103 |
| Embodiment 5 | Negative electrode active substance A | Negative electrode active substance H | 50 | 50 | Presence | 3.8 | 12.0 | 103 | 102 |
| Comparative example 1 | Negative electrode active substance E | — | 100 | 0 | Absence | 3.8 | 9.2 | 115 | 130 |
| Comparative example 2 | Negative electrode active substance F | Negative electrode active substance G | 50 | 50 | Presence | 3.6 | 10.0 | 113 | 125 |

As shown in Table 1, it can be understood that Comparative example 1 and Comparative example 2 both have the higher negative electrode expansion rate and the higher post-preservation resistance increasing rate. In Comparative example 1, the surface of the negative electrode active substance E as the first negative electrode active substance was provided with a cover of the low crystalline carbon, the graphite interlayer distance of the low crystalline carbon was 3.8 Å, but the cover of the low crystalline carbon was not confirmed inside the negative electrode active substance E. Thus, it is estimated that the negative electrode expansion rate and the post-preservation resistance increasing rate became higher. In Comparative example 2, the graphite interlayer distance of the low crystalline carbon on the negative electrode active substance F as the first negative electrode active substance was less than 3.8 Å. Thus, it is estimated that the low crystalline carbon was made to be easily separated and thus the negative electrode expansion rate and the post-preservation resistance increasing rate became higher.

On the other hand, Embodiments 1 to 5 include at least the first negative electrode active substance and the second negative electrode active substance, the first negative electrode active substance is configured with the aggregated bodies of the scaly graphites whose surface of at least one part is covered with the low crystalline carbon, the graphite interlayer distance of the low crystalline carbon is 3.8 to 5.0 Å, and it can be understood that Embodiments 1 to 5 have the lower negative electrode expansion rate and the lower post-preservation resistance increasing rate.

2. Study of Compounding Ratio of First Negative Electrode Active Substance and Second Negative Electrode Active Substance Embodiments 6 and 7

The lithium ion secondary batteries for evaluation of Embodiments 6 and 7 were manufactured similarly to Embodiment 1, except for having changed the compounding ratio of the first negative electrode active substance and the second negative electrode active substance as shown in Table 2.

Embodiment 8

The lithium ion secondary battery for evaluation of Embodiment 8 was manufactured similarly to Embodiment 1, except for having added 1 mass % of LiBOB as the additive agent to the nonaqueous electrolyte.

Comparative Examples 3 and 4

The lithium ion secondary batteries for evaluation of Comparative examples 3 and 4 were manufactured similarly to Embodiment 1, except for having changed the compounding ratio of the first negative electrode active substance and the second negative electrode active substance as shown in Table 2.

Evaluation of Lithium Ion Secondary Battery for Each Evaluation

For the lithium ion secondary batteries for each evaluation (Embodiments 1 and 6 to 8 and Comparative examples 3 and 4), the negative electrode expansion rate, the resistance increasing rate, and the initial resistance value were obtained as described above. The results are shown in Table 2. Incidentally, the results of resistance increasing rates shown in Table 2 are resistance increasing rates in the case where the initial resistance value of respective samples are treated as 100. In addition, the results of the ratios of initial resistance values shown in Table 2 are ratios of initial resistance values of respective samples in the case where the initial resistance value of Embodiment 1 is treated as 100.

TABLE 2

|  | First negative electrode active substance | Second negative electrode active substance | Compounding ratio (mass %) | |
|---|---|---|---|---|
|  |  |  | First active substance | Second active substance |
| Embodiment 1 | Negative electrode active substance A | Negative electrode active substance G | 50 | 50 |
| Embodiment 6 | Negative electrode active substance A | Negative electrode active substance G | 70 | 30 |
| Embodiment 7 | Negative electrode active substance A | Negative electrode active substance G | 90 | 10 |
| Embodiment 8 | Negative electrode active substance A | Negative electrode active substance G | 50 | 50 |
| Comparative example 3 | Negative electrode active substance A | Negative electrode active substance G | 49 | 51 |
| Comparative example 4 | Negative electrode active substance A | Negative electrode active substance G | 91 | 9 |

|  | Low crystalline carbon | | | | |
|---|---|---|---|---|---|
|  | Presence or absence inside cctive substance | Graphite interlayer distance (Å) | L/S | Negative electrode expansion rate (%) | post-preservation resistance increasing rate (%) | Ratio of initial resistance value |
| Embodiment 1 | Presence | 3.8 | 10.9 | 108 | 105 | 100 |
| Embodiment 6 | Presence | 3.8 | 11.0 | 105 | 103 | 100 |
| Embodiment 7 | Presence | 3.8 | 11.5 | 104 | 102 | 101 |
| Embodiment 8 | Presence | 3.8 | 10.9 | 108 | 102 | 100 |
| Comparative example 3 | Presence | 3.8 | 9.5 | 112 | 127 | 99 |
| Comparative example 4 | Presence | 3.8 | 16.4 | 102 | 101 | 110 |

As shown in Table 2, it can be understood that Comparative example 3 has the higher negative electrode expansion rate and the higher post-preservation resistance increasing rate. Since Comparative example 3 has the compounding ratio of the first negative electrode active substance that is less than 50 mass %, it is estimated that the effect induced by the low crystalline carbon cover existing inside became to be hardly obtained and thus that the negative electrode expansion rate and the post-preservation resistance increasing rate became higher. It can be understood that Comparative example 4 becomes to have the higher ratio of the initial resistance value. It is estimated that Comparative example 4 became to have the higher initial resistance since the compounding ratio of the second negative electrode active substance having the high ion diffusion property is less than 10 mass %.

On the other hand, as Embodiment 1 and Embodiment 6 to 8 both have the compounding ratio (mass ratio) of the first negative electrode active substance and second negative electrode active substance being 50:50 to 90:10, it can be understood that the negative electrode expansion rate, the post-preservation resistance increasing rate, and the ratio of the initial resistance value in them become lower. In addition, from the result of Embodiment 8, it can be understood that adding LiBOB induces further decrease in the post-preservation resistance increasing rate than Embodiment 1. It is estimated that the edge surface of the scaly graphite configuring the first negative electrode active substance is suitably covered with the low crystalline carbon so as to induce an effect of suppressing the SEI membrane from being excessively formed, and the effect causes the above described decrease.

According to the above described results, it is configured with the aggregated body of the scaly graphite whose surface of at least one part is covered with the low crystalline carbon, the low crystalline carbon includes the first negative electrode active substance whose graphite interlayer distance based on the electron diffraction images by the transmission electron microscope is equal to or more than 3.8 Å and not more than 5.0 Å and includes the second negative electrode active substance which is a natural graphite or artificial graphite whose graphite interlayer distance is equal to or more than 3.35 Å and not more than 3.4 Å, and the negative electrode whose mass ratio of the first negative electrode active substance and second negative electrode active substance is 50:50 to 90:10 can decrease the initial resistance of the nonaqueous electrolyte secondary battery and can implement improving the durability.

Above, the specific examples of the present disclosure have been described in a detail, which are merely illustrative, and are not construed as limiting the scope of the appended claims The technology according to the appended claims includes various modifications and changes of the embodiments described up to this point.

What is claimed is:

1. A negative electrode used for a nonaqueous electrolyte secondary battery, comprising:
   a negative electrode collector and a negative electrode active substance layer that is formed on the negative electrode collector,
   wherein the negative electrode active substance layer comprises at least a first negative electrode active substance and a second negative electrode active substance,
   the first negative electrode active substance is configured with an aggregated body of a plurality of scaly graphite particles, a cover of low crystalline carbon is present inside the first negative electrode active substance, each of the plurality of scaly graphite particles, including edge surfaces of each of the plurality of scaly graphite particles that make up the aggregated body of the scaly graphite is entirely coated with the low crystalline carbon such that the entire outer peripheral surface of each of the plurality of scaly graphite particles is completely covered with the low crystalline carbon, a graphite interlayer distance of the low crystalline carbon based on electron diffraction images by a transmission electron microscope is equal to or more than 3.8 Å and not more than 5.0 Å, the second negative electrode active substance is a natural graphite or an artificial graphite whose graphite interlayer distance based on electron diffraction images by the transmission electron microscope is equal to or more than 3.35 Å and not more than 3.4 Å, and a mass ratio of the first negative electrode active substance and the second negative electrode active substance is 50:50 to 90:10.

2. The negative electrode according to claim 1,
wherein the negative electrode active substance layer comprises a peak $P_L$ on a side having a relatively large fine hole diameter and a peak $P_S$ on a side having a relatively small fine hole diameter, on a Log differential pore volume distribution measured by a mercury penetration method, and a ratio (L/S) of a peak area L occupied by the peak $P_L$ with respect to a peak area S occupied by the peak $P_S$ is 10.5 to 11.5.

3. A nonaqueous electrolyte secondary battery provided with an electrode body having a positive electrode and a negative electrode, and with a nonaqueous electrolyte, the nonaqueous electrolyte secondary battery comprising: the negative electrode according to claim 1, as the negative electrode.

4. The nonaqueous electrolyte secondary battery according to claim 3,
wherein the nonaqueous electrolyte comprises an oxalate complex chemical compound and/or carbonates as a coating film forming agent.

\* \* \* \* \*